(12) United States Patent
Parnell

(10) Patent No.: US 9,908,006 B1
(45) Date of Patent: Mar. 6, 2018

(54) INJECTION MOLDED GOLF BALL CORES

(71) Applicant: Callaway Golf Company, Carlsbad, CA (US)

(72) Inventor: Shane Parnell, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 15/299,786

(22) Filed: Oct. 21, 2016

Related U.S. Application Data

(60) Division of application No. 14/719,184, filed on May 21, 2015, now Pat. No. 9,474,942, which is a continuation-in-part of application No. 14/554,510, filed on Nov. 26, 2014.

(60) Provisional application No. 61/911,064, filed on Dec. 3, 2013.

(51) Int. Cl.
| | |
|---|---|
| *A63B 37/04* | (2006.01) |
| *C08G 63/672* | (2006.01) |
| *A63B 37/00* | (2006.01) |
| *C08G 63/199* | (2006.01) |
| *C08G 63/183* | (2006.01) |

(52) U.S. Cl.
CPC ...... *A63B 37/0051* (2013.01); *A63B 37/0024* (2013.01); *A63B 37/0027* (2013.01); *A63B 37/0031* (2013.01); *A63B 37/0033* (2013.01); *A63B 37/0039* (2013.01); *A63B 37/0043* (2013.01); *A63B 37/0045* (2013.01); *A63B 37/0075* (2013.01); *A63B 37/0076* (2013.01); *A63B 37/0092* (2013.01); *A63B 37/04* (2013.01); *C08G 63/183* (2013.01); *C08G 63/199* (2013.01); *C08G 63/672* (2013.01)

(58) Field of Classification Search
None
See application file for complete search history.

(56) References Cited

U.S. PATENT DOCUMENTS 3,261,812 A * 7/1966 Bell .................. C08G 63/672
264/290.5
2005/0288125 A1* 12/2005 Takesue ............ A63B 37/0003
473/371

\* cited by examiner

*Primary Examiner* — David J Buttner
(74) *Attorney, Agent, or Firm* — Michael A. Catania; Sonia Lari; Rebecca Hanovice

(57) ABSTRACT

Use of highly phase separated thermoplastic polyether ester elastomers for injection molded golf ball core layers is disclosed herein. The thermoplastic polyether ester elastomer comprises a polytetramethylene glycol (PTMO), a cycloaliphatic diol, and dimethyl terephthalate.

8 Claims, 13 Drawing Sheets

INJECTION MOLDED GOLF BALL CORES

CROSS REFERENCES TO RELATED APPLICATIONS

The Present Application is a divisional application of U.S. patent application Ser. No. 14/719,184, filed on May 21, 2015 now U.S. Pat. No. 9,474,942, which is a continuation-in-part application of U.S. patent application Ser. No. 14/554,510, filed on Nov. 26, 2014 now abandoned, which claims priority to U.S. Provisional Patent Application Number 61/91,104, filed on Dec. 3, 2013, now expired, all of which are hereby incorporated by reference in their entireties.

STATEMENT REGARDING FEDERALLY SPONSORED RESEARCH OR DEVELOPMENT

Not Applicable

BACKGROUND OF THE INVENTION

Field of the Invention

The present invention relates to a golf ball. More specifically, the present invention relates to the use of highly phase separated thermoplastic polyether ester elastomers for injection molded golf ball core layers.

Description of the Related Art

The prior art discloses golf ball cores composed of thermoplastic materials.

While TPEEs typically have high rebound resilience, they aren't resilient enough for use in some higher compression golf ball core applications. In addition, they don't quite match the rebound resilience of ionomeric thermoplastic elastomers. This is especially true for higher modulus formulations and at high strain rates.

BRIEF SUMMARY OF THE INVENTION

The goal of this invention is to increase the rebound resilience of TPEEs for use in injection molded golf ball core layers. Higher core resilience will result in higher golf ball coefficient of restitution (C.O.R.), higher ball launch velocities, and ultimately more ball distance. Higher rebound resilience will also allow TPEEs to compete with ionomeric thermoplastic elastomers for use in golf ball core layers, increasing design freedom for the golf ball designer and potentially lower cost.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
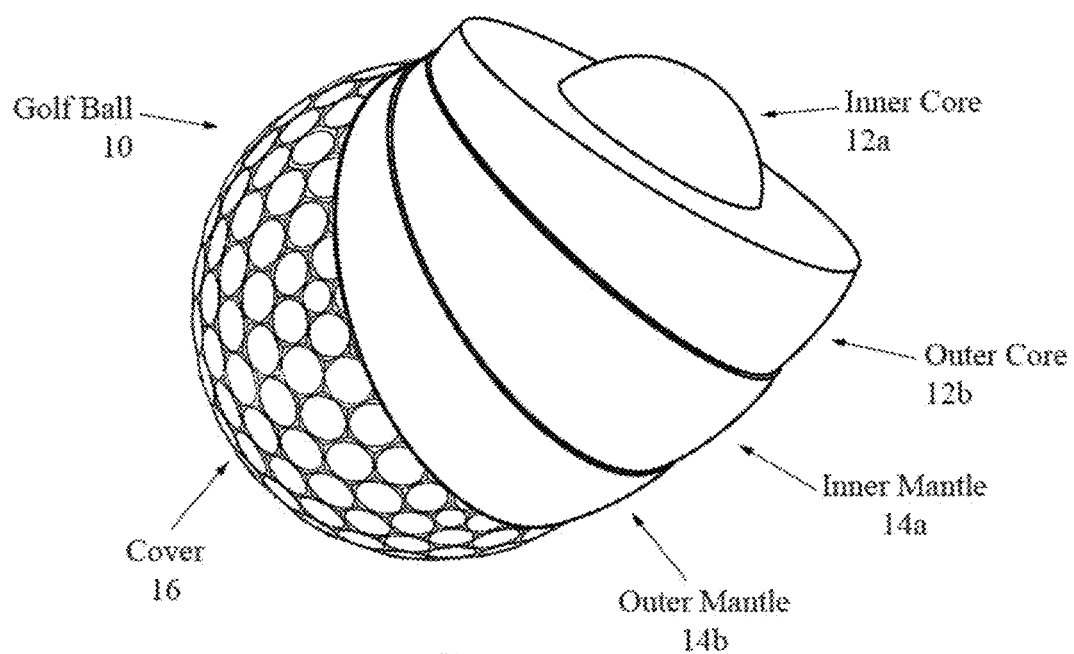
FIG. 1 is an exploded partial cut-away view of a golf ball.
Figure 2:
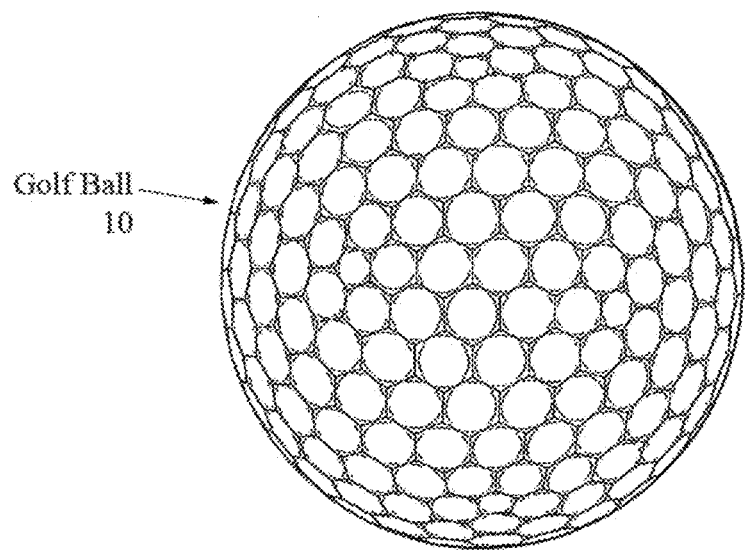
FIG. 2 is top perspective view of a golf ball.
Figure 3:
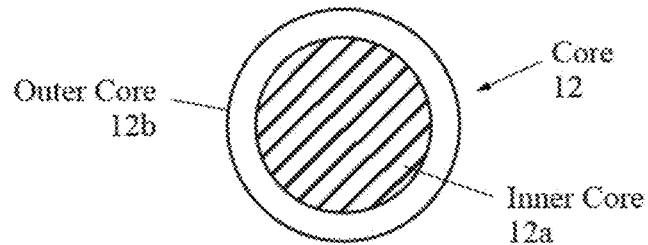
FIG. 3 is a cross-sectional view of a core component of a golf ball.
Figure 4:
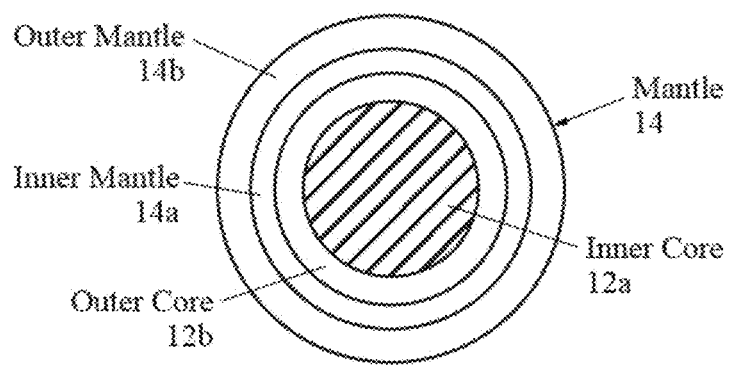
FIG. 4 is a cross-sectional view of a core component and a mantle component of a golf ball.

When used in golf balls, injection moldable thermoplastic elastomers (TPE) offer significant economic advantages over thermoset polymer systems. This is especially true for golf ball cores where compression molded polybutadiene thermoset systems are typically used. Relatively low conversion costs make TPEs very attractive alternatives to thermoset systems.

Thermoplastic polyether ester elastomers (TPEE) in particular are well suited for use in golf ball cores. Relative to thermoplastic polyamide elastomers and most thermoplastic polyurethane elastomers, TPEEs exhibit high levels of rebound resilience. Relative to ionomers they have higher density reducing the need for modification with high density fillers. Common trade names for these materials include HYTREL from DuPont and ARNITEL from DSM. However, the TPEE material is also used in other layers of a golf ball including the mantle layer and the cover layer.

TPEEs are typically synthesized by ester interchange of a long chain glycol and a short chain glycol with the methyl ester of a dicarboxylic acid. Typical building blocks include polytetramethylene glycol (PTMO), tetramethylene glycol (i.e. 1,4-butanediol), and dimethyl terephthalate, respectively. PTMO with a number average molecular weight ($M_n$) of ca. 1000 g/mol is commonly used.

In this invention, TPEEs are preferably formed from cycloaliphatic diols. Preferred cycloaliphatic diols include cycloaliphatic diols having four or six carbons in a ring structure, with substituents along the ring (e.g. methyl, ethyl, etc.), and the number of carbons between the hydroxyl group and ring carbon ranging from zero to two. Commercially available cycloaliphatic diols include 1,4-cyclohexanedimethnol and 2,2,4,4-tetramethyl-1,3-cyclobutanediol. The TPEEs preferably are formed from polytetramethylene glycol (PTMO), 2,2,4,4-tetramethyl-1,3-cyclobutanediol and dimethyl terephthalate, and polytetramethylene glycol (PTMO) 1,4-cyclohexanedimethnol, and dimethyl terephthalate instead of the more common 1,4-butanediol. This results in shorter more polar hard segments which in turn increases the overall degree of hard segment ordering and solid state phase separation in these materials. As with thermoplastic polyurethane elastomers and other similar segmented block copolymers, this also increases rebound resilience.

Use of cycloaliphatic diols improve rebound resilience of TPEEs in injection molded golf ball core layers, and other injection molded layers of a golf ball.

FIGS. 1, 3, 4 and 5 illustrate a five piece golf ball 10 comprising an inner core 12a, an outer core 12b, an inner mantle 14a, an outer mantle 14b, and a cover 16, wherein a TPEE material is present in at least one of the layers. Preferably, the entire layer is composed of the TPEE material.

Figure 5:
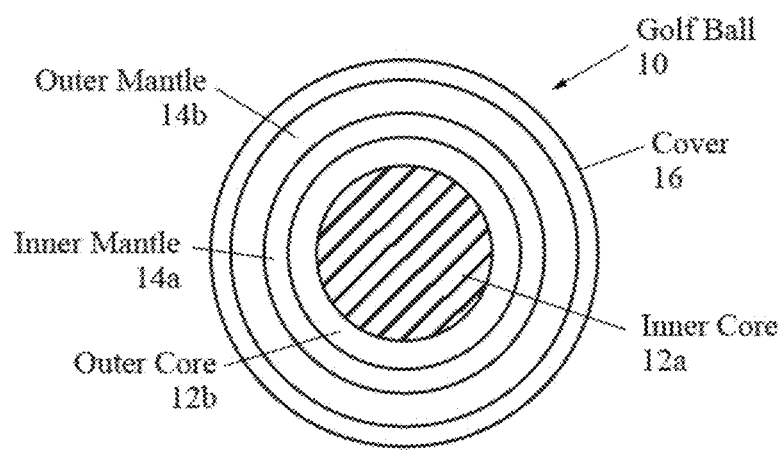
FIG. 5 is a cross-sectional view of an inner core layer, an outer core layer, an inner mantle layer, an outer mantle layer and a cover layer of a golf ball.
Figure 5A:
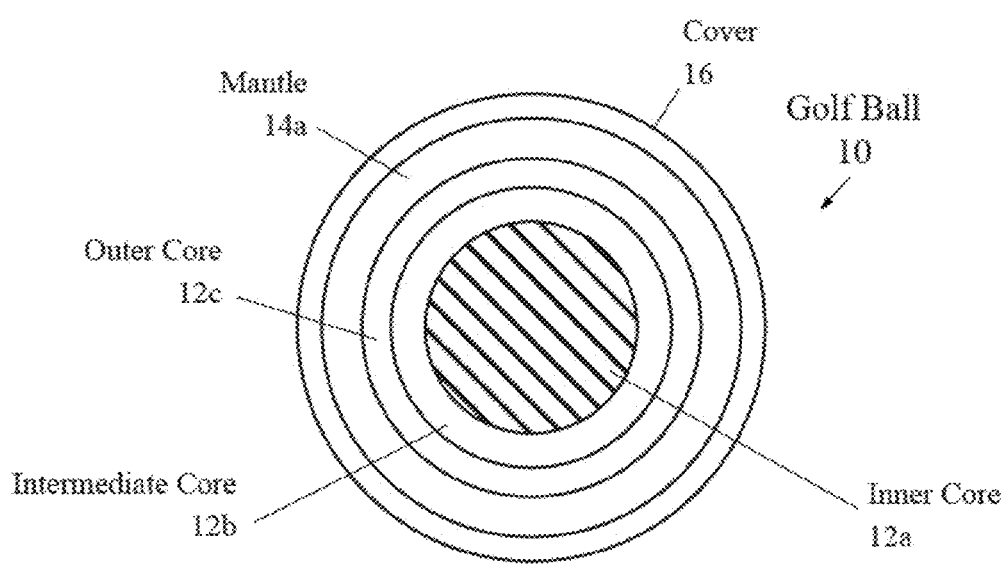
FIG. 5A is a cross-sectional view of an inner core layer, an intermediate core layer, an outer core layer, a mantle layer and a cover layer of a golf ball.

FIG. 5A illustrates a five piece golf ball 10 comprising an inner core 12a, an intermediate core 12b, an outer core 12c, a mantle 14, and a cover 16, wherein a TPEE material is present in at least one of the layers. Preferably, the entire layer is composed of the TPEE material.

Figure 8:
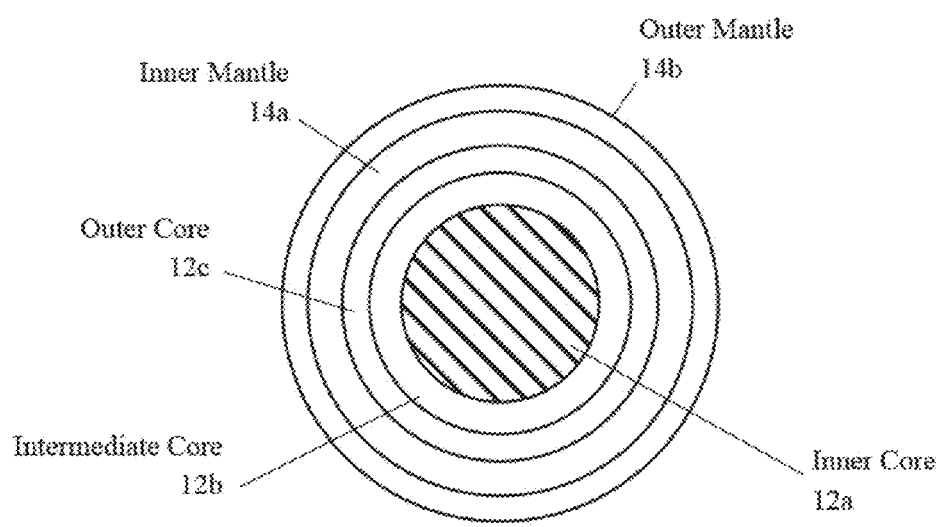
FIG. 8 is a cross-sectional view of a core component and a mantle component of a golf ball.
Figure 9:
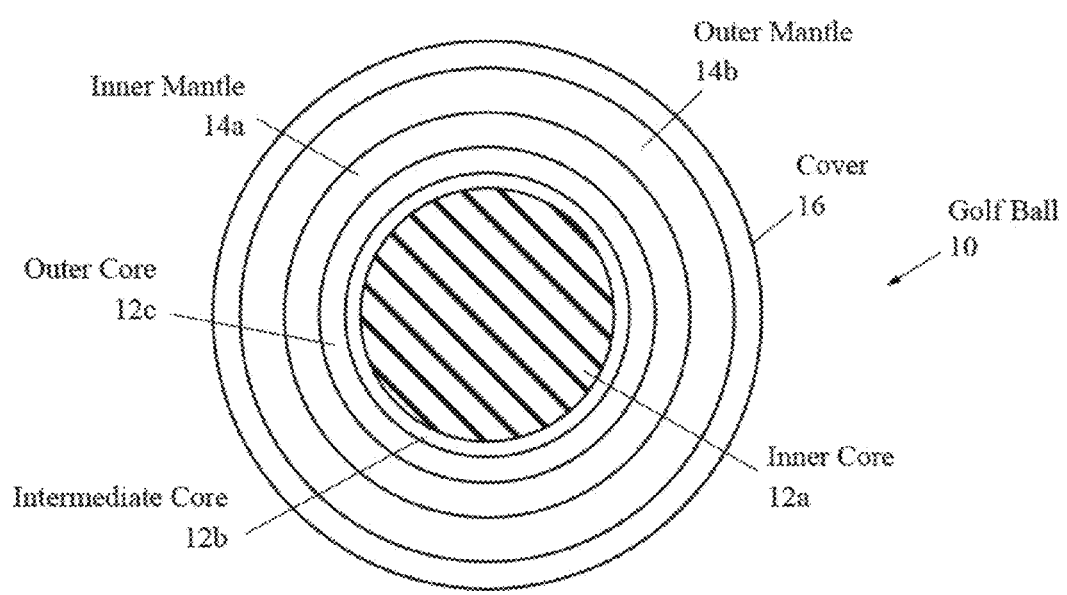
FIG. 9 is a cross-sectional view of a core component, the mantle component and a cover layer of a golf ball.

FIGS. 8 and 9 illustrate a six piece golf ball 10 comprising an inner core 12a, an intermediate core 12b, an outer core 12c, an inner mantle 14a, an outer mantle 14b, and a cover 16, wherein a TPEE material is present in at least one of the layers. Preferably, the entire layer is composed of the TPEE material.

Figure 10:
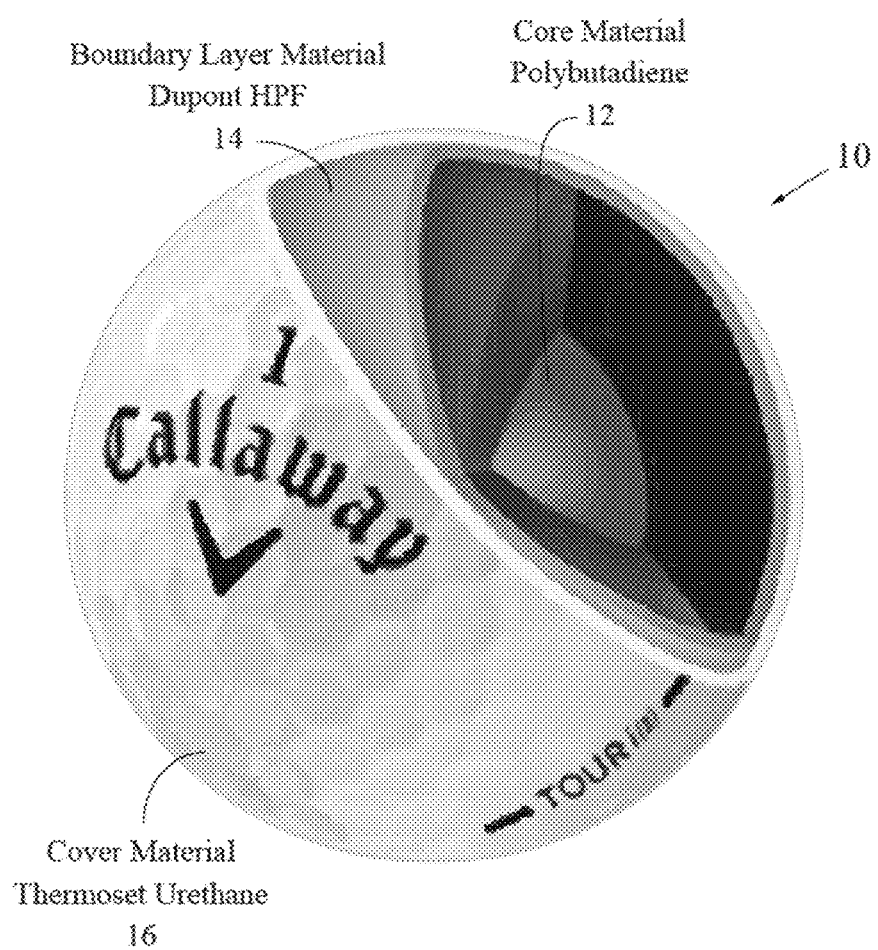
FIG. 10 is an exploded partial cut-away view of a four-piece golf ball.

FIG. 10 illustrates a four piece golf ball comprising a dual core, a boundary layer and a cover, wherein a TPEE material is present in at least one of the layers. Preferably, the entire layer is composed of the TPEE material.

Figure 11:
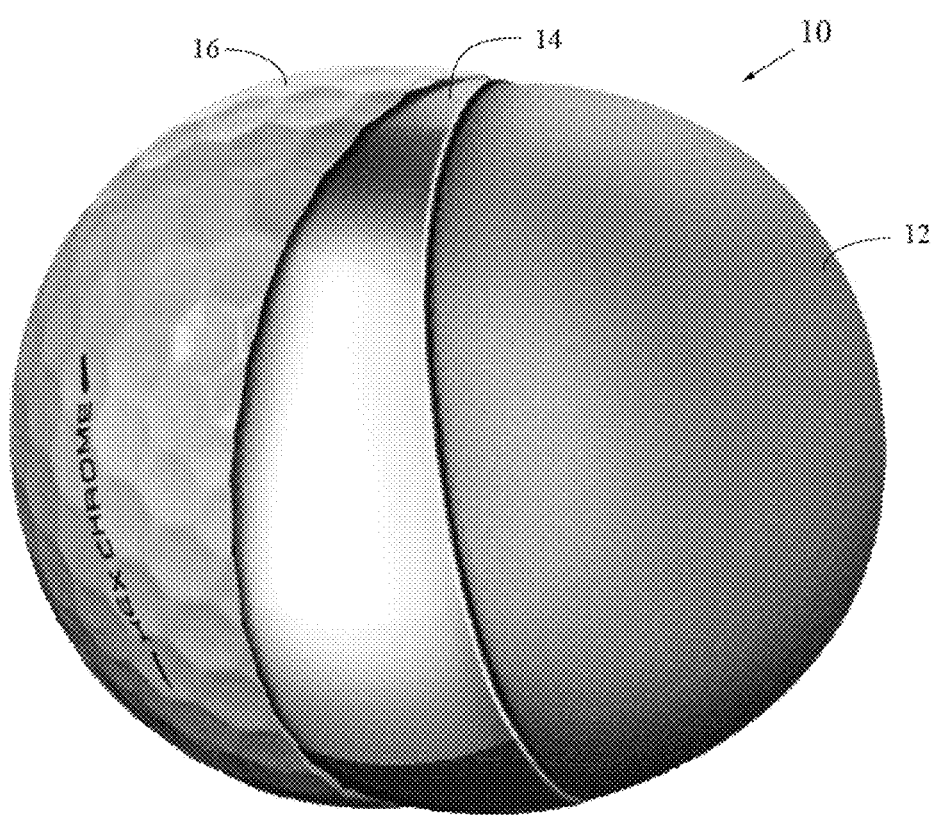
FIG. 11 is an exploded partial cut-away view of a three-piece golf ball.

FIG. 11 illustrates a three piece golf ball comprising a core, a boundary layer and a cover, wherein a TPEE material is present in at least one of the layers. Preferably, the entire layer is composed of the TPEE material.

Figure 12:
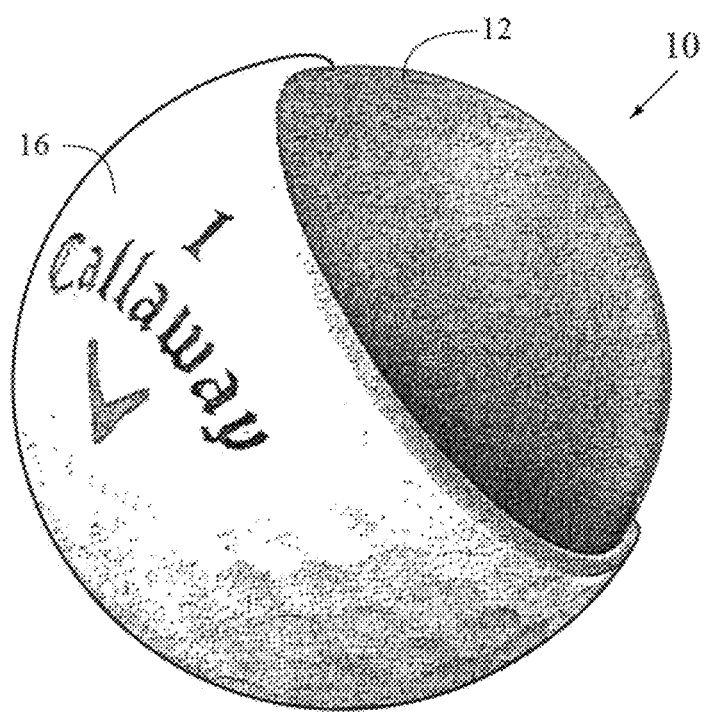
FIG. 12 is an exploded partial cut-away view of a two-piece golf ball.
Figure 13:
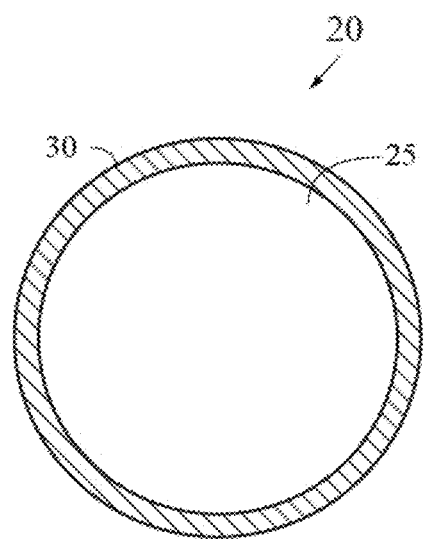
FIG. 13 is a cross-sectional view of a two-piece golf ball.

FIGS. 12 and 13 illustrate a two piece golf ball 20 with a core 25 and a cover 30, wherein a TPEE material is present in at least one of the layers. Preferably, the entire layer is composed of the TPEE material.

Figure 14:
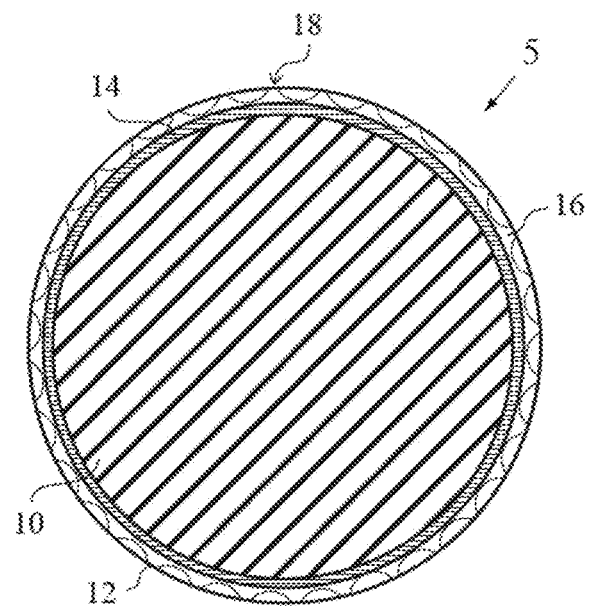
FIG. 14 is a cross-sectional view of a three-piece golf ball.
Figure 15:
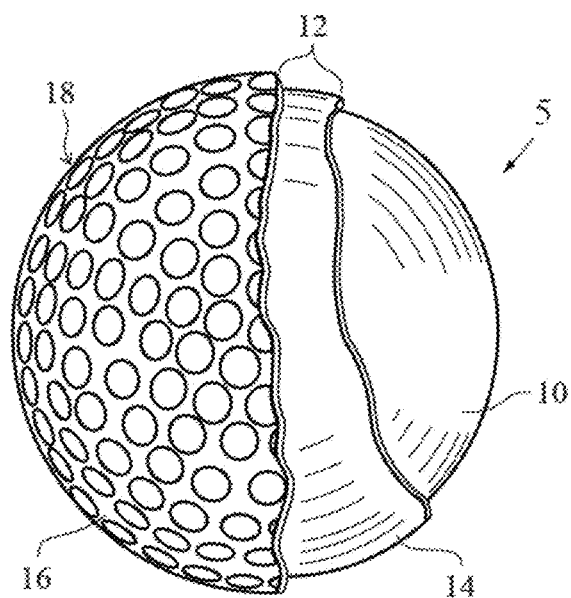
FIG. 15 is an exploded partial cut-away view of a three-piece golf ball.

FIGS. 14 and 15 illustrate a three-piece golf ball 5 comprising a core 10, a mantle layer 14 and a cover 16 with dimples 18, wherein a TPEE material is present in at least one of the layers. Preferably, the entire layer is composed of the TPEE material.

Figure 16:
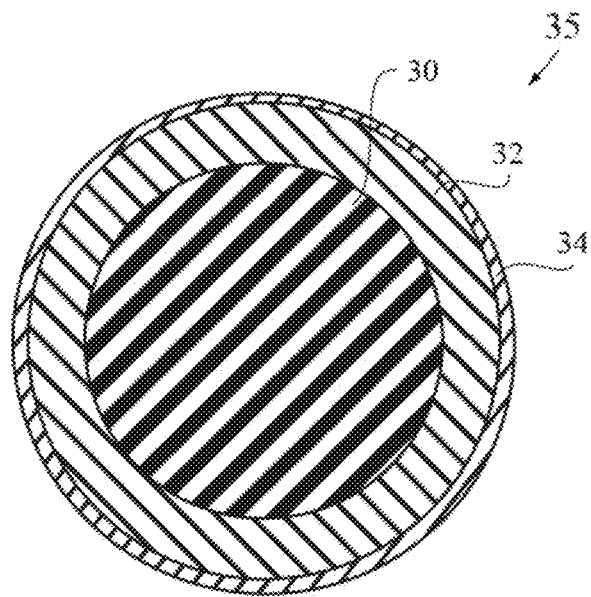
FIG. 16 is a cross-sectional view of a three-piece golf ball with a dual core and a cover.

FIG. 16 illustrates a dual core three piece golf ball 35 comprising an inner core 30, and outer core 32 and a cover 34, wherein a TPEE material is present in at least one of the layers. Preferably, the entire layer is composed of the TPEE material.

Figure 17:
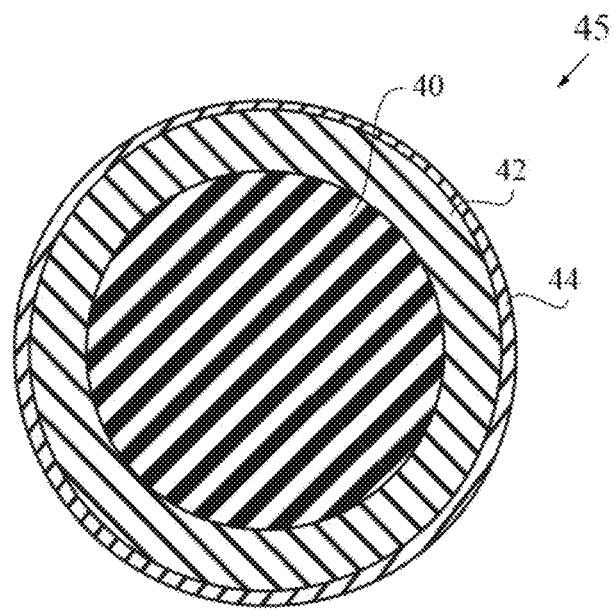
FIG. 17 is a cross-sectional view of a three-piece golf ball with a core, mantle and cover.

FIG. 17 illustrates a three piece golf ball 45 comprising a core 40, a mantle layer 42 and a cover 44, wherein a TPEE material is present in at least one of the layers. Preferably, the entire layer is composed of the TPEE material.

Figure 18:
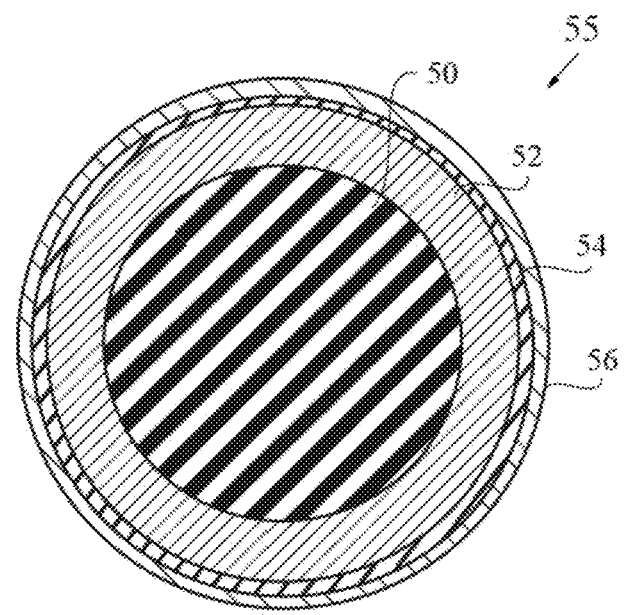
FIG. 18 is a cross-sectional view of a four-piece golf ball with a dual core, mantle layer and a cover.

FIG. 18 illustrates a dual core four piece golf ball 55 comprising an inner core 50, an outer core 52, a mantle layer 54 and a cover 56, wherein a TPEE material is present in at least one of the layers. Preferably, the entire layer is composed of the TPEE material.

Figure 19:
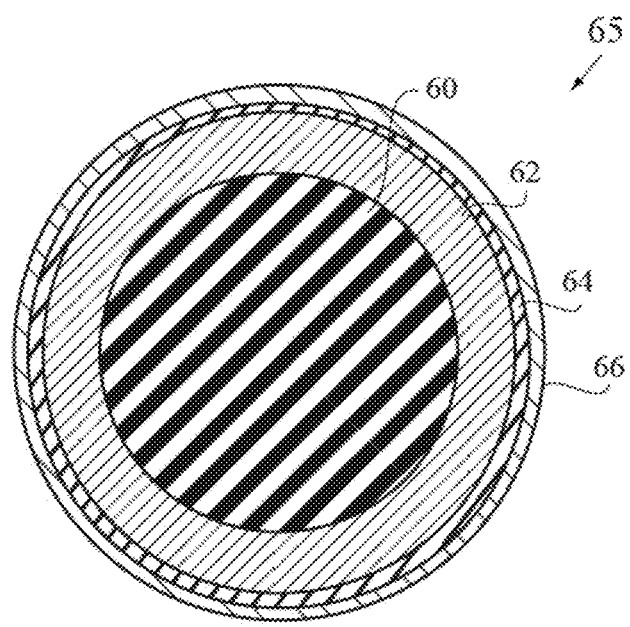
FIG. 19 is a cross-sectional view of a four-piece golf ball with a core, dual mantle layers and a cover.

FIG. 19 illustrates a four piece golf ball 65 comprising a core 60, an inner mantle 62, an outer mantle 64 and a cover 66, wherein a TPEE material is present in at least one of the layers. Preferably, the entire layer is composed of the TPEE material.

In a preferred embodiment, the cover is preferably composed of a thermoplastic polyurethane material, and preferably has a thickness ranging from 0.025 inch to 0.04 inch, and more preferably ranging from 0.03 inch to 0.04 inch. The material of the cover preferably has a Shore D plaque hardness ranging from 30 to 60, and more preferably from 40 to 50. The Shore D hardness measured on the cover is preferably less than 56 Shore D. Preferably the cover 16 has a Shore A hardness of less than 96. Alternatively, the cover 16 is composed of a thermoplastic polyurethane/polyurea material. One example is disclosed in U.S. Pat. No. 7,367,903 for a Golf Ball, which is hereby incorporated by reference in its entirety. Another example is Melanson, U.S. Pat. No. 7,641,841, which is hereby incorporated by reference in its entirety. Another example is Melanson et al, U.S. Pat. No. 7,842,211, which is hereby incorporated by reference in its entirety. Another example is Matroni et al., U.S. Pat. No. 7,867,111, which is hereby incorporated by reference in its entirety. Another example is Dewanjee et al., U.S. Pat. No. 7,785,522, which is hereby incorporated by reference in its entirety.

The mantle component is preferably composed of the inner mantle layer and the outer mantle layer. The mantle component preferably has a thickness ranging from 0.05 inch to 0.15 inch, and more preferably from 0.06 inch to 0.08 inch. The outer mantle layer is preferably composed of a blend of ionomer materials. One preferred embodiment comprises SURLYN 9150 material, SURLYN 8940 material, a SURLYN AD1022 material, and a masterbatch. The SURLYN 9150 material is preferably present in an amount ranging from 20 to 45 weight percent of the cover, and more preferably 30 to 40 weight percent. The SURLYN 8945 is preferably present in an amount ranging from 15 to 35 weight percent of the cover, more preferably 20 to 30 weight percent, and most preferably 26 weight percent. The SURLYN 9945 is preferably present in an amount ranging from 30 to 50 weight percent of the cover, more preferably 35 to 45 weight percent, and most preferably 41 weight percent. The SURLYN 8940 is preferably present in an amount ranging from 5 to 15 weight percent of the cover, more preferably 7 to 12 weight percent, and most preferably 10 weight percent.

SURLYN 8320, from DuPont, is a very-low modulus ethylene/methacrylic acid copolymer with partial neutralization of the acid groups with sodium ions. SURLYN 8945, also from DuPont, is a high acid ethylene/methacrylic acid copolymer with partial neutralization of the acid groups with sodium ions. SURLYN 9945, also from DuPont, is a high acid ethylene/methacrylic acid copolymer with partial neutralization of the acid groups with zinc ions. SURLYN 8940, also from DuPont, is an ethylene/methacrylic acid copolymer with partial neutralization of the acid groups with sodium ions.

The inner mantle layer is preferably composed of a blend of ionomers, preferably comprising a terpolymer and at least two high acid (greater than 18 weight percent) ionomers neutralized with sodium, zinc, magnesium, or other metal ions. The material for the inner mantle layer preferably has a Shore D plaque hardness ranging preferably from 35 to 77, more preferably from 36 to 44, a most preferably approximately 40. The thickness of the outer mantle layer preferably ranges from 0.025 inch to 0.050 inch, and is more preferably approximately 0.037 inch. The mass of an insert including the dual core and the inner mantle layer preferably ranges from 32 grams to 40 grams, more preferably from 34 to 38 grams, and is most preferably approximately 36 grams. The inner mantle layer is alternatively composed of a HPF material available from DuPont. Alternatively, the inner mantle layer 14*b* is composed of a material such as disclosed in Kennedy, III et al., U.S. Pat. No. 7,361,101 for a Golf Ball And Thermoplastic Material, which is hereby incorporated by reference in its entirety.

The outer mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. The material of the outer mantle layer preferably has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. The mass of the entire insert including the core, the inner mantle layer and the outer mantle layer preferably ranges from 38 grams to 43 grams, more preferably from 39 to 41 grams, and is most preferably approximately 41 grams.

In an alternative embodiment, the inner mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. In this embodiment, the material of the inner mantle layer has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. Also in this embodiment, the outer mantle layer 14*b* is composed of a blend of ionomers, preferably comprising a terpolymer and at least two high acid (greater than 18 weight percent) ionomers neutralized with sodium, zinc, magnesium, or other metal ions. In this embodiment, the material for the outer mantle layer 14*b* preferably has a Shore D plaque hardness ranging preferably from 35 to 77, more preferably from 36 to 44, a most preferably approximately 40. The thickness of the outer mantle layer preferably ranges from 0.025 inch to 0.100 inch, and more preferably ranges from 0.070 inch to 0.090 inch.

In yet another embodiment wherein the inner mantle layer is thicker than the outer mantle layer and the outer mantle layer is harder than the inner mantle layer, the inner mantle layer is composed of a blend of ionomers, preferably comprising a terpolymer and at least two high acid (greater than 18 weight percent) ionomers neutralized with sodium, zinc, magnesium, or other metal ions. In this embodiment, the material for the inner mantle layer has a Shore D plaque hardness ranging preferably from 30 to 77, more preferably from 30 to 50, and most preferably approximately 40. In this embodiment, the material for the outer mantle layer has a Shore D plaque hardness ranging preferably from 40 to 77, more preferably from 50 to 71, and most preferably approximately 67. In this embodiment, the thickness of the inner mantle layer preferably ranges from 0.030 inch to 0.090 inch, and the thickness of the outer mantle layer ranges from 0.025 inch to 0.070 inch.

Preferably the inner core has a diameter ranging from 0.75 inch to 1.20 inches, more preferably from 0.85 inch to 1.05 inch, and most preferably approximately 0.95 inch. Preferably the inner core 12*a* has a Shore D hardness ranging from 20 to 50, more preferably from 25 to 40, and most preferably approximately 35. Preferably the inner core is formed from TPEE comprising cycloaliphatic diols. Preferably the inner core has a mass ranging from 5 grams to 15 grams, 7 grams to 10 grams and most preferably approximately 8 grams.

Preferably the outer core has a diameter ranging from 1.25 inch to 1.55 inches, more preferably from 1.40 inch to 1.5 inch, and most preferably approximately 1.5 inch. Preferably the outer core has a Shore D surface hardness ranging from 40 to 65, more preferably from 50 to 60, and most preferably approximately 56. Preferably the outer core is formed from a polybutadiene, zinc diacrylate, zinc oxide, zinc stearate, a peptizer and peroxide. Preferably the combined inner core and outer core have a mass ranging from 25 grams to 35 grams, 30 grams to 34 grams and most preferably approximately 32 grams.

Figure 6:
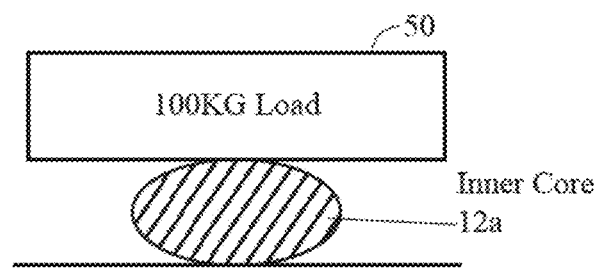
FIG. 6 is a cross-sectional view of an inner core layer under a 100 kilogram load.
Figure 7:
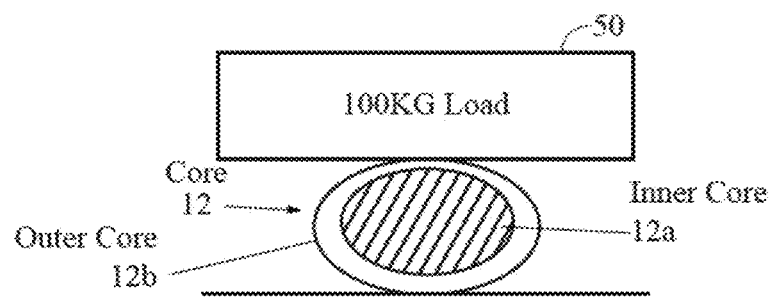
FIG. 7 is a cross-sectional view of a core under a 100 kilogram load.

Preferably the inner core has a deflection of at least 0.230 inch under a load of 220 pounds, and the core has a deflection of at least 0.080 inch under a load of 200 pounds. As shown in FIGS. 6 and 7, a mass 50 is loaded onto an inner core and a core. As shown in FIGS. 6 and 7, the mass is 100 kilograms, approximately 220 pounds. Under a load of 100 kilograms, the inner core preferably has a deflection from 0.230 inch to 0.300 inch. Under a load of 100 kilograms, preferably the core has a deflection of 0.08 inch to 0.150 inch. Alternatively, the load is 200 pounds (approximately 90 kilograms), and the deflection of the core 12 is at least 0.080 inch. Further, a compressive deformation from a beginning load of 10 kilograms to an ending load of 130 kilograms for the inner core ranges from 4 millimeters to 7 millimeters and more preferably from 5 millimeters to 6.5 millimeters. The dual core deflection differential allows for low spin off the tee to provide greater distance, and high spin on approach shots.

In an alternative embodiment of the golf ball shown in FIG. 5A, the golf ball 10 comprises an inner core 12*a*, an intermediate core 12*b*, an outer core 12*b*, a mantle 14 and a cover 16. The golf ball 10 preferably has a diameter of at least 1.68 inches, a mass ranging from 45 grams to 47 grams, a COR of at least 0.79, a deformation under a 100 kilogram loading of at least 0.07 mm.

In one embodiment, the golf ball comprises a core, a mantle layer and a cover layer. The core comprises an inner core sphere, an intermediate core layer and an outer core layer. The inner core sphere comprises a TPEE material and has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer.

The mantle layer is disposed over the core, comprises an ionomer material and has a Shore D hardness greater than 55. The cover layer is disposed over the mantle layer comprises a thermoplastic polyurethane material and has a Shore A hardness less than 100. The golf ball has a diameter of at least 1.68 inches. The mantle layer is harder than the outer core layer, the outer core layer is harder than the intermediate core layer, the intermediate core layer is harder than the inner core sphere, and the cover layer is softer than the mantle layer.

In another embodiment, shown in FIGS. 8 and 9, the golf ball 10 has a multi-layer core and multi-layer mantle. The golf ball includes a core, a mantle component and a cover layer. The core comprises an inner core sphere, an intermediate core layer and an outer core layer. The inner core sphere comprises a TPEE material and has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer 12c. The inner mantle layer is disposed over the core, comprises an ionomer material and has a Shore D hardness greater than 55. The outer mantle layer is disposed over the inner mantle layer, comprises an ionomer material and has a Shore D hardness greater than 60. The cover layer is disposed over the mantle component, comprises a thermoplastic polyurethane material and has a Shore A hardness less than 100. The golf ball has a diameter of at least 1.68 inches. The outer mantle layer is harder than the inner mantle layer, the inner mantle layer is harder than the outer core layer, the outer core layer is harder than the intermediate core layer, the intermediate core layer is harder than the inner core sphere, and the cover layer is softer than the outer mantle layer.

In a particularly preferred embodiment of the invention, the golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety.

Various aspects of the present invention golf balls have been described in terms of certain tests or measuring procedures. These are described in greater detail as follows.

As used herein, "Shore D hardness" of the golf ball layers is measured generally in accordance with ASTM D-2240 type D, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore D hardness of the cover is measured while the cover remains over the mantles and cores. When a hardness measurement is made on the golf ball, the Shore D hardness is preferably measured at a land area of the cover.

As used herein, "Shore A hardness" of a cover is measured generally in accordance with ASTM D-2240 type A, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore A hardness of the cover is measured while the cover remains over the mantles and cores. When a hardness measurement is made on the golf ball, Shore A hardness is preferably measured at a land area of the cover The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head speed, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the COR and the surface configuration of the ball.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of ballistic screens, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The measurements for deflection, compression, hardness, and the like are preferably performed on a finished golf ball as opposed to performing the measurement on each layer during manufacturing.

Preferably, in a five layer golf ball comprising an inner core, an outer core, an inner mantle layer, an outer mantle layer and a cover, the hardness/compression of layers involve an inner core with the greatest deflection (lowest hardness), an outer core (combined with the inner core) with a deflection less than the inner core, an inner mantle layer with a hardness less than the hardness of the combined outer core and inner core, an outer mantle layer with the hardness layer of the golf ball, and a cover with a hardness less than the hardness of the outer mantle layer. These measurements are preferably made on a finished golf ball that has been torn down for the measurements.

Preferably the inner mantle layer is thicker than the outer mantle layer or the cover layer. The dual core and dual mantle golf ball creates an optimized velocity-initial velocity ratio (Vi/IV), and allows for spin manipulation. The dual core provides for increased core compression differential resulting in a high spin for short game shots and a low spin for driver shots. A discussion of the USGA initial velocity test is disclosed in Yagley et al., U.S. Pat. No. 6,595,872 for a Golf Ball With High Coefficient Of Restitution, which is hereby incorporated by reference in its entirety. Another example is Bartels et al., U.S. Pat. No. 6,648,775 for a Golf Ball With High Coefficient Of Restitution, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A golf ball comprising:
   a center core comprising a thermoplastic polyether ester elastomer, the thermoplastic polyether ester elastomer formed from a reaction of a polytetramethylene glycol (PTMO), a 2,2,4,4-tetramethyl-1,3-cyclobutanediol, and dimethyl terephthalate;
   an outer core disposed over the center core;
   an inner mantle layer disposed over the outer core, the inner mantle layer having a thickness ranging from 0.025 inch to 0.040 inch, the inner mantle layer composed of an ionomer material, the inner mantle layer material having a plaque Shore D hardness ranging from 65 to 71;
   an outer mantle layer disposed over the inner mantle layer, the outer mantle layer having a thickness ranging from 0.070 inch to 0.090 inch, the outer mantle layer composed of a block copolymer material; and
   a cover layer disposed over the outer mantle layer, the cover layer having a thickness ranging from 0.025 inch to 0.040 inch, the cover layer composed of a thermoplastic polyurethane material having a plaque Shore D hardness ranging from 40 to 50, and the on cover Shore D hardness less than 56;
   wherein the cover layer has a lower Shore D hardness than the outer mantle layer, the outer mantle layer has a higher Shore D hardness than the inner mantle layer, the outer core has a higher Shore D harness than the inner mantle layer and the center core.

2. A golf ball comprising:
   a center core comprising a thermoplastic polyether ester elastomer, the thermoplastic polyether ester elastomer formed from a reaction of a polytetramethylene glycol (PTMO), a 2,2,4,4-tetramethyl-1,3-cyclobutanediol, and dimethyl terephthalate;
   an outer core disposed over the center core;
   an inner mantle layer disposed over the outer core, the inner mantle layer having a thickness ranging from 0.030 inch to 0.090 inch, the inner mantle layer material having a plaque Shore D hardness ranging from 30 to 50;
   an outer mantle layer disposed over the inner mantle layer, the outer mantle layer having a thickness ranging from 0.025 inch to 0.070 inch, the outer mantle layer material having a plaque Shore D hardness ranging from 50 to 71, wherein the inner mantle is thicker than the outer mantle and the outer mantle is harder than the inner mantle; and
   a cover layer is disposed over the outer mantle layer, the cover layer having a thickness ranging from 0.025 inch to 0.050 inch, wherein the cover layer has a Shore D hardness less than the hardness of the outer mantle layer, wherein the cover layer has a lower Shore D hardness than the outer mantle layer, the outer mantle layer has a higher Shore D hardness than the inner mantle layer, the outer core has a higher Shore D harness than the inner mantle layer and the center core.

3. The golf ball according to claim 2 wherein the cover layer material has a plaque Shore A hardness less than 96.

4. The golf ball according to claim 2 wherein the cover layer material is composed of a thermoplastic polyurethane material.

5. The golf ball according to claim 2 wherein the cover layer material is composed of a thermoplastic polyurea material.

6. The golf ball according to claim 2 wherein the cover layer material is composed of a thermoplastic polyurethane/polyurea material.

7. A golf ball comprising
   a center core comprising a thermoplastic polyether ester elastomer, the thermoplastic polyether ester elastomer formed from a reaction of a polytetramethylene glycol (PTMO), a 2,2,4,4-tetramethyl-1,3-cyclobutanediol, and dimethyl terephthalate;
   an outer core disposed over the center core;
   an inner mantle layer disposed over the outer core, the inner mantle layer having a thickness ranging from 0.070 inch to 0.090 inch, the inner mantle layer composed of an ionomer material, the inner mantle layer material having a plaque Shore D hardness ranging from 36 to 44;
   an outer mantle layer disposed over the inner mantle layer, the outer mantle layer having a thickness ranging from 0.025 inch to 0.040 inch, the outer mantle layer composed of an ionomer material, the outer mantle layer material having a plaque Shore D hardness ranging from 65 to 71; and
   a cover layer is disposed over the outer mantle layer, the cover layer having a thickness ranging from 0.025 inch to 0.040 inch, the cover layer composed of a thermoplastic polyurethane material, the cover layer material having a plaque Shore D hardness ranging from 40 to 50, and the on cover Shore D hardness less than 56;
   wherein the cover layer has a lower Shore D hardness than the outer mantle layer, the outer mantle layer has a higher Shore D hardness than the inner mantle layer, the outer core has a higher Shore D harness than the inner mantle layer and the center core.

8. The golf ball according to claim 7 wherein the outer core is composed of a polybutadiene material, zinc penta chloride, organic peroxide, zinc stearate, zinc diacrylate and zinc oxide.

* * * * *